United States Patent [19]

Shibata

[11] Patent Number: 4,903,488
[45] Date of Patent: Feb. 27, 1990

[54] TURBOCHARGED ENGINE INCLUDING AN ENGINE DRIVEN SUPERCHARGER

[75] Inventor: Noriyoshi Shibata, Nagoya, Japan

[73] Assignee: Aisin Seiki Kabushiki Kaisha, Kariya, Japan

[21] Appl. No.: 251,403

[22] Filed: Sep. 30, 1988

[30] Foreign Application Priority Data

Sep. 30, 1987 [JP] Japan .................... 62-246705

[51] Int. Cl.⁴ ............................. F02B 37/04
[52] U.S. Cl. ....................................... 60/609
[58] Field of Search ................... 60/609, 610

[56] References Cited

U.S. PATENT DOCUMENTS 4,505,117  3/1985  Matsuoka ............... 60/609
4,730,457  3/1988  Yamada et al. ......... 60/609
4,738,110  4/1988  Tateno ................. 60/609 X

FOREIGN PATENT DOCUMENTS 222919  12/1983  Japan ..................... 60/609
142824   6/1987  Japan ..................... 60/609

Primary Examiner—Michael Koczo
Attorney, Agent, or Firm—Burns, Doane, Swecker & Mathis

[57] ABSTRACT

An engine has an air supply passage and an exhaust gas passage. A supercharger and a turbocharger compressor are disposed in the air supply passage. The turbocharger compressor is disposed downstream of the supercharger and is driven by a turbocharger turbine disposed in the exhaust gas passage. A valved air by-pass is provided for conducting air around the supercharger between the supercharger outlet and inlet. A valved exhaust gas by-pass is provided for conducting exhaust gas around the turbine. During engine low speed operation the air by-pass and exhaust gas by-pass are closed and air is compressed by both the supercharger and compressor acting in series. During an intermediate speed range, the air by-pass is partially opened under the control of the air pressure at the compressor outlet to assure that such air pressure does not exceed a preset value. During a high speed range (i) the supercharger is shut down and the air by-pass is fully open so that only the turbocharger compresses air, and (ii) the exhaust gas by-pass is opened under the control of the pressure in the air inlet passage to reduce the operation of the turbine and thereby assure that the air pressure in the air supply passage does not exceed the preset value.

3 Claims, 3 Drawing Sheets

TURBOCHARGED ENGINE INCLUDING AN ENGINE DRIVEN SUPERCHARGER

BACKGROUND OF THE INVENTION

1. Field of the Invention

This invention relates generally to multiple compressed air supply systems for an engine in a motor vehicle or a heavy industrial machine, for example, and more particularly to a multiple compressed air supply system including (1) a supercharger driven by engine output power via a driving power transmitting mechanism interconnecting the engine with an electro-magnetically operated clutch of the supercharger, and (2) a turbocharger having a turbine driven by engine exhaust gas and a compressor driven by the turbine.

2. Description of the Prior Art

Generally, with a multiple compressed air supply system it is possible to supply compressed air in all speed ranges of an engine by effectively utilizing a high performance supercharger for supplying compressed air in a low speed range of the engine, and utilizing a high performance turbocharger for supplying compressed air in a high speed range of the engine.

A prior art multiple compressed air supply system is disclosed in Japanese Laid-open Patent No. 58(1983)-222919 published on Dec. 24, 1983. The basic structure of a multiple compressed air supply system in that prior art involves a supercharger and a turbocharger able to be connected to each other in series or parallel by a three-way valve and a dumping mechanism. However, the switching between series and parallel connections is not performed in accordance with the driving condition of the supercharger and the turbocharger, so the compressed air pressure may be excessively changed upon switching, and the switching action is not smooth.

Another prior art multiple compressed air supply system is disclosed in Japanese Laid-open Patent No. 62(1987)-101834 published on May 12, 1987. The basic structure of a multiple compressed air supply system in the latter prior art involves a supercharger and a turbocharger interconnected in series and a control valve is disposed in a bypass passage connected to the supercharger. Switching from the supercharger and turbocharger dual operating condition into a supercharger-stopped condition is initiated upon the detection of a certain operating condition of a wastegate valve. When the supercharger and turbocharger are both operated, the turbocharger operation is reduced by an opening of the wastegate valve; therefore, a timing of the switching is delayed and the time for switching to be completed is lengthened whereby too much driving power is lost. Furthermore, the turbocharger is disposed upstream of the supercharger, whereupon during a period of low compressed air pressure in the turbocharger (e.g. during a low speed range of the engine), full use of the supercharger is not realized because the turbocharger is operated as an inhalation resistor such that a vacuum is generated at the turbocharger compressor which sucks oil into an intake air passage portion from the compressor.

SUMMARY OF THE INVENTION

One of the objects of the present invention is to provide an improved multiple compressed air supply system, wherein the foregoing disadvantages are alleviated.

To achieve this object, a multiple compressed air supply system according to the invention is constructed as follows:

A supercharger is driven by engine output power via a driving power transmitting mechanism that connects with an engine through an electro-magnetically operated clutch. A turbocharger has a turbine driven by exhaust gas energy flowing within an engine exhaust gas passage and a compressor driven by the turbine. The turbine is disposed in an intake air passage of the engine. An outlet portion of the supercharger communicates with the intake air passage upstream of the compressor and also communicates with an inlet portion of the supercharger via an intake air bypassing passage. An inlet portion of the turbine communicates with an outlet portion of the turbine via an exhaust gas bypassing passage. A control valve disposed in the intake air bypassing passage is controlled to be (i) fully closed during an engine low speed range, (ii) partially opened during an engine intermediate speed range so as to keep pressure at the compressor outlet no greater than a first preset value in response to the pressure at the compressor outlet, and (iii) fully opened during an engine high speed range. A wastegate valve disposed in the exhaust gas bypassing passage is operated only during a driving condition of the turbocharger for controlling the exhaust gas in a manner maintaining the pressure at the compressor outlet no greater than the first preset value. A control device disengages the clutch when a differential pressure between the compressor inlet and outlet reaches a second preset value.

In the multiple compressed air supply system according to the present invention, during the engine low speed range, the intake air bypassing passage is fully closed by the control valve thereby limiting the compression of air by the turbocharger. Therefore, the differential pressure between the compressor inlet and outlet does not reach the preset value, so the clutch is not disengaged and the wastegate valve is kept closed. Consequently, both supercharger and turbocharger are fully operated in series.

During the engine intermediate speed range, a certain compressed air pressure is obtained from the supercharger and the turbocharger whereby a pressure at the compressor outlet is capable of exceeding the preset value. Accordingly, the control valve is operated and recirculates the compressed air from the outlet portion of the supercharger back into the inlet portion of the supercharger so that the compressed air pressure at the compressor outlet does not exceed the preset value. The amount of recirculating compressed air increases in response to the increasing of compressed air pressure (the differential pressure noted above) by means of the turbocharger whereby the compressed air pressure from the supercharger is decreased.

During the engine high speed range, when the differential pressure reaches the second preset value and the compressed air pressure from the supercharger is dropped to zero, the operation of the supercharger is stopped by disengagement of the clutch, and the control valve disposed in the intake bypassing passage is fully opened. Thereafter, air is sucked into the turbocharger compressor through the intake air bypassing passage which is caused to become fully opened whereby the supplying of compressed air pressure is effected only by the turbocharger. In such a condition, when the pressure at the compressor outlet tends to increase beyond the preset value, the wastegate valve is opened whereby the amount of exhaust gas flowing to the turbine is decreased, and the compressed air pressure is maintained at the first preset value.

BRIEF DESCRIPTION OF THE DRAWINGS

Various other objects, features and attendant advantages of the present invention will be more fully appreciated as the same becomes better understood from the following detailed description when considered in connection with the accompanying drawings wherein.

DETAILED DESCRIPTION OF THE PREFERRED EMBODIMENT

Figure 1:
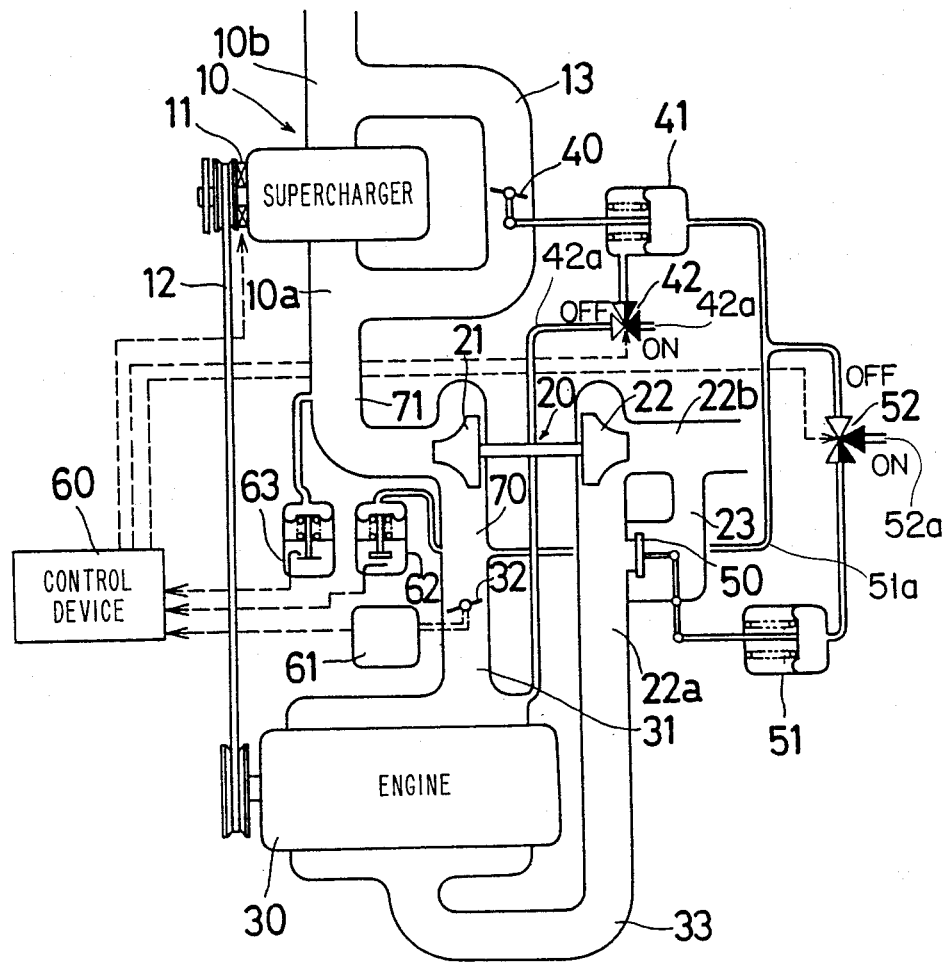
FIG. 1 is a schematic system diagram of one embodiment of the present invention.

Referring now to the drawings, there is shown in FIG. 1, a multiple compressed air supply system including a supercharger 10 and a turbocharger 20. A throttle valve 32 is disposed in an engine air supply passage 31. Also, the inlet portion 10b of supercharger 10 is communicated with an outlet portion 10a of supercharger 10 via an intake air bypassing passage 13. The inlet portion 10b of supercharger 10 communicates with atmosphere passing through an air cleaner (not shown). A control valve 40 is disposed in the intake air bypassing passage 13. The amount of opening of the control valve 40 is controlled by an actuator 41. The operation of actuator 41 is controlled by a solenoid valve 42.

A turbine 22 of the turbocharger 20 is disposed in an exhaust gas passage 33. An inlet portion 22a of turbine 22 is communicated with an outlet portion 22b of turbine 22 via an exhaust gas bypassing passage 23. A wastegate valve 50 is disposed in the exhaust gas bypassing passage 23. The amount of opening of the wastegate valve 50 is controlled by an actuator 51. The operation of actuator 51 is controlled by a solenoid valve 52.

Figure 2:
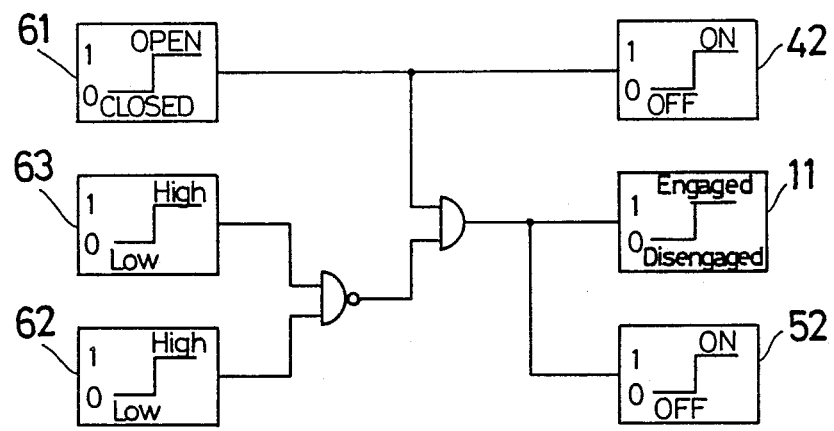
FIG. 2 shows a control logic for the system according to FIG. 1.

Operation of the clutch 11 and the solenoid valves 42 and 52 is controlled by an electrical control device 60 in accordance with signals generated by a throttle valve switch 61 and pressure detecting switches 62 and 63, as shown in FIG. 2. The throttle valve switch 61 is interlocked with a throttle valve 32 and generates a "Closed" signal when the throttle valve 32 is closed and an "Opened" signal when the throttle valve 32 is opened. The pressure detecting switch 62 detects pressure at a region 70 between a downstream side of compressor 21 and an upstream side of throttle valve 32. The pressure detecting switch 62 generates a "Low" signal when the pressure at the region 70 is lower than a preset value P1 and generates a "High" signal when the pressure at the region 70 is higher than the preset value P1. The pressure detecting switch 63 detects pressure at a region 71 in an upstream side of compressor 21. The pressure detecting switch 63 generates a "Low" signal when the pressure at the region 71 is higher than a value P2 which is slightly higher than atmospheric and generates a "High" signal when the pressure at the region 71 is substantially atmospheric.

In an idling condition of engine 30 or an engine braked condition (the throttle valve 32 being closed), the "Closed" signal from throttle valve switch 61 causes the electrical control device 60 to operate the clutch 11 and solenoid valves 42 and 52 to be in an "OFF" condition respectively whereby (a) the supercharger 10 is stopped, (b) vacuum in intake air passage 31 is introduced via pressure take-off 42a into a left side chamber in actuator 41 to fully open the control valve 40, and (c) a pressure at the region 70 is introduced via pressure take-off 51a into a right side chamber in actuator 51. The amount of opening of wastegate valve 50 is controlled by the pressure intensity at the region 70 (at this time, the pressure at the portion 70 would not exceed a preset value P0 which is substantially equal to preset value P1 minus preset value P2, so the wastegate valve 50 would be fully closed). Accordingly, at this time, only the turbocharger 20 is operated, but little compressed air is supplied thereby due to the slight flow of exhaust gas from the engine.

Figure 3:
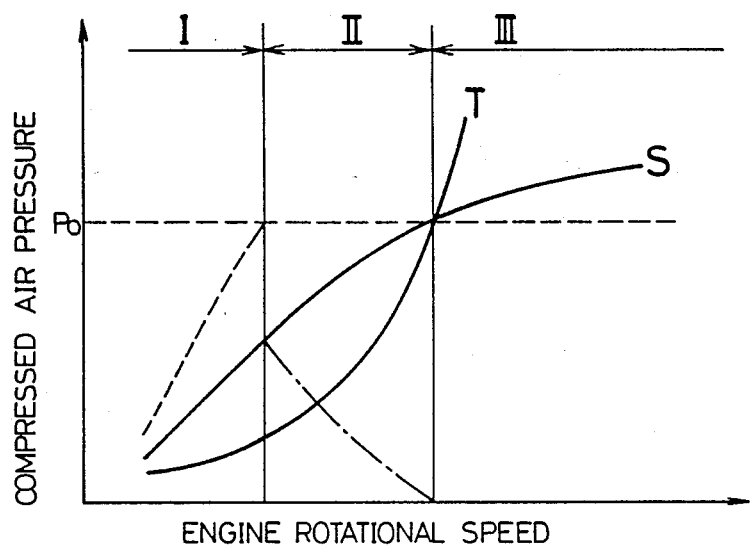
FIG. 3 is a graph showing a characteristic of compressed air pressure in the system according to FIG. 1.

In a low speed range of engine 30 (the throttle valve 32 is opened but the pressure detected at region 70 by pressure detecting switch 62 is lower than the preset value P1), there will occur an "Opened" signal from throttle valve switch 61 and a "Low" signal from pressure detecting switch 62. Thus, regardless of the signal from pressure detecting switch 63, the electrical control device 60 operates the clutch 11 to be 'Engaged' and solenoid valves 42 and 52 to be in an "ON" condition respectively whereby,(a) the supercharger, 10 is driven by engine 30, (b) atmospheric pressure from a pressure supply line 42a is introduced into the left side chamber in actuator 41 and (c) compressed air is introduced into the right side chamber in actuator 41. However, the pressure of that compressed air is lower than the preset value P0 as shown by an interrupted line in an area I in FIG. 3 whereby the control valve 40 is in a fully closed condition. Atmospheric pressure is introduced into the right side chamber of actuator 51 from a pressure supply line 42a whereby the wastegate valve 50 is in fully closed condition. Accordingly, at this time, supercharger 10 and turbocharger 20 are connected in series and are fully operating, whereby the sum of compressed air pressure S contributed by supercharger 10 and compressed air pressure T contributed by turbocharger 20 (as shown by an dashed line in an area I in FIG. 3) is supplied to the region 70.

In an intermediate speed range of engine 30 (namely, wherein the throttle valve 32 is opened so that the pressure at the region 71 is high, and the compressed air pressure at the region 70 is controlled by control valve 40 so as not to exceed the preset value PO), there will occur an "opened" signal from throttle valve switch 61 and a "Low" signal from pressure detecting switch 63. Thus, the electrical control device 60 controls the electro-magnetically operated clutch 11 to be in engaged condition and the solenoid valve 42 to be in "ON" condition, whereby atmospheric pressure is introduced into the left side chamber of actuator 41, and the compressed air pressure is introduced into the right side chamber of actuator 41. Therefore, the amount of opening of control valve 40 is controlled. As a result, a compressed air is recirculated from outlet portion 10a to inlet rotion 10of supercharger 10 via intake air bypassing passage 13 so that the pressure at the outlet portion of compressor 21 does not exceed the preset value PO. The recirculating amount of compressed air increases in accordance with increasing of compressed air pressure T by turbocharger 20, because the valve 40 will be further opened. Thus, the compressed air pressure from supercharger 10 drops as shown in a dash-dot line in an area II in FIG. 3.

When the engine 30 reaches the high speed range, (a) the control valve 40 is fully opened, (b) the pressure detected by pressure detecting switch 63 is substantially atmospheric, and (c) the differential pressure between upstream and downstream sides of compressor 21 substantially equals the preset value PO. As a result, the compressed air pressure S contributed by supercharger 10 is zero, and the control valve 40 is ineffective in preventing the compressed air pressure at the region 70 from exceeding the preset value PO. Because of the "Opened" signal from throttle valve switch 61 and the "High" signals from pressure detecting switches 62 and 63, the electrical control device 60 controls solenoid valve 52 and clutch 11 to be in "OFF" and "Disengaged" conditions, respectively, whereby the operation of the supercharger 10 is stopped and the control valve 40 is maintained in a fully opened condition. As a result, atmospheric pressure is sucked into compressor 21 of turbocharger 20 via the fully open intake air bypassing passage 13 whereby the compressed air is supplied by only turbocharger 20. In such a condition, when the pressure (compressed air pressure) at the outlet portion of compressor 21 rises beyond the preset value PO, the wastegate valve 50 is opened, whereby the amount of exhaust gas flowing within turbine 22 is decreased so that the compressed air pressure is maintained at the preset value PO.

According to the present invention, the following advantages are obtained:

1. The loss of driving power for driving the supercharger is minimized because the compressed air pressure obtained by turbocharger can be fully utilized; also, the compressed air pressure contributed by the supercharger is minimized because the wastegate valve is kept in a fully closed condition until the compressed air pressure contributed by turbocharger exceeds the preset value (namely, until only the turbocharger is operated), so the turbocharger is always fully operated during the supercharger and turbocharger multiple operating condition.

2. The switching from multiple operation of the supercharger and turbocharger into a turbocharger-only operation is improved because the compressed air pressure generated by the turbocharger is detected by measuring the pressures upstream and downstream of the turbocharger, and the driving of the supercharger is stopped gradually in accordance with such upstream and downstream detected pressures.

3. There is no occurrence of a vacuum in the compressor of the turbocharger which would suck oil from the compressor, because the compressor of the turbocharger is arranged downstream of the supercharger.

4. The structure of the system is simple because the intake air bypassing passage is used not only as a passage for recirculating compressed air from the supercharger inlet to the supercharger outlet during the multiple operation of supercharger and turbocharger, but also as an inhaling passage having noninhalation resistor during supercharger-only operation.

Figure 4:
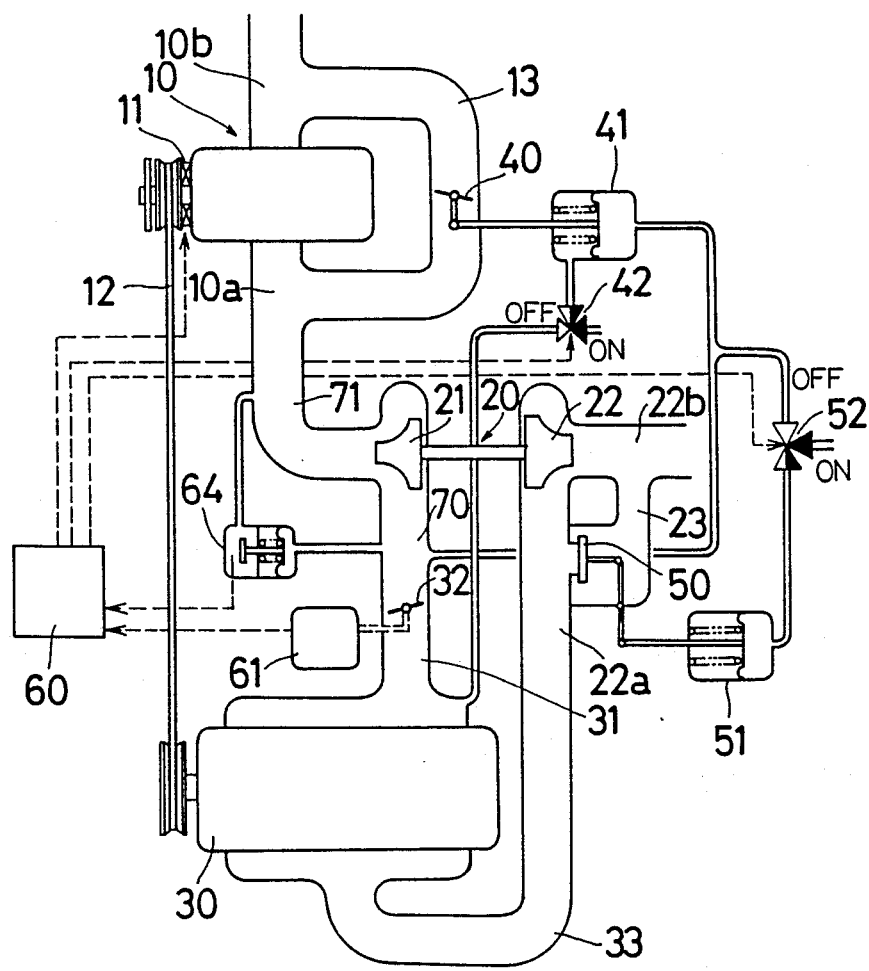
FIG. 4 is a schematic system diagram of a modified embodiment of the present invention.

Another embodiment of the invention is depicted in FIG. 4. That embodiment is identical to the embodiment described earlier in connection with FIG. 1, except that the pressure detecting switch arrangement 62, 63 has been replaced by a single, differential-type pressure detecting switch 64 which communicates with both regions 70, 71.

Furthermore, instead of controlling the control valve 40 and wastegate valve 50 by means of actuators 41, 51 and solenoid valves 42, 52, there can instead be utilized a stepping motor controlled by a computer.

Obviously, many other modifications and variations of the present invention are possible in light of the above teachings. It is therefore to be understood that within the scope of the appended claims the invention may be practiced otherwise than as specifically described herein.

What is claimed is:

1. A multiple compressed air supply system comprising:
    an engine including a power output;
    an air supply passage for conducting air to said engine;
    an exhaust gas passage for conducting exhaust gas from said engine;
    an air supercharger including an air inlet and an air outlet, said air outlet communicating with said air supply passage by means of an air bypass said supercharger including a disengageable clutch operably connected to said power output to enable said supercharger to be driven by said engine when said clutch is engaged;
    a turbocharger including a turbine disposed in said exhaust gas passage for being driven by engine exhaust gas and an air compressor driven by said turbine,
    said compressor disposed in said air supply passage downstream of said supercharger,
    pressure sensing means for detecting pressures at an inlet and an outlet of said compressor;
    an exhaust gas bypass interconnecting portions of said exhaust gas passage disposed upstream and downstream of said turbine;
    adjustable control valve means for regulating the amount of air flowing through said air bypass;
    adjustable wastegate valve means for regulating the amount of exhaust gas flowing through said exhaust gas bypass; and
    control means operably connected to said pressure sensing means, said clutch means, and said control valve means for:
        engaging said clutch and closing said control valve means when said engine is operated in a low speed range,
        engaging said clutch and partially opening said control valve means when said engine is operated in an intermediate speed range for maintaining the air pressure at said compressor outlet to be no greater than a first preset value, and
        fully opening said control valve means when said engine is operated in a high speed range, and for disengaging said clutch when a differential pressure between said compressor inlet and outlet reaches a second preset value,
    said control means being operably connected to said wastegate valve means for opening said wastegate valve means to control the operation of said turbine in a manner maintaining compressor outlet pressure no higher than said first preset value when said engine is operated in said high speed range and said clutch is disengaged.

2. A multiple compressed air supply system according to claim 1 including a throttle valve disposed in said air supply passage downstream of said compressor, actuating means for actuating said control valve means including a pressure responsive member connected to said control valve means, a pressure take-off for communicating said pressure responsive member with said air supply passage downstream of said throttle valve, a pressure supply line for communicating said pressure responsive member with atmospheric pressure, and valve means controlled by said control means for selectively connecting one of said pressure take-off and said pressure supply line to said pressure-responsive member.

3. A multiple compressed air supply according to claim 1 including a throttle valve disposed in said air supply passage downstream of said compressor, actuating means for actuating said wastegate valve means including a pressure responsive member connected to said wastegate valve means, a pressure take-off for communicating said pressure responsive member with said air supply passage upstream of said throttle valve, a pressure supply line for communicating said pressure responsive member with atmospheric pressure, and valve means controlled by said control means for selectively connecting one of said pressure take-off and said pressure supply line to said pressure-responsive member.

* * * * *